United States Patent [19]

Schoeneweis

[11] 4,216,703
[45] Aug. 12, 1980

[54] VALVE ACTUATOR

[75] Inventor: E. Frederick Schoeneweis, Kearney, Nebr.

[73] Assignee: Rockwell International Corporation, Pittsburgh, Pa.

[21] Appl. No.: 897,061

[22] Filed: Apr. 17, 1978

[51] Int. Cl.$^2$ .......................... F01B 7/02; F01B 31/18
[52] U.S. Cl. .......................................... 92/63; 92/75; 92/86; 92/110; 92/134
[58] Field of Search ...................... 92/63, 134, 75, 110; 138/31

[56] References Cited

U.S. PATENT DOCUMENTS

| | | | |
|---|---|---|---|
| 2,479,454 | 8/1949 | Annin | 92/134 |
| 2,937,622 | 5/1960 | Brimhall | 92/110 |
| 2,943,642 | 7/1960 | Westcott, Jr. | 60/418 |
| 2,961,015 | 11/1960 | Randall | 92/110 |
| 3,168,853 | 2/1965 | Prince | 92/110 |
| 3,509,795 | 5/1970 | Woodword | 92/63 |

Primary Examiner—Paul E. Maslousky

[57] ABSTRACT

A valve actuator includes a hydraulic cylinder with a pair of pistons separately, slidably mounted therein for movement between a first end and a second end of the cylinder. An actuator rod is joined to a first of the pistons to extend through an opening in the first end of the cylinder to terminate exterior thereto and be capable of being joined to a valve stem. A high pressure gas accumulator is mounted on the cylinder to locate the second end thereof within the accumulator. The second end of the cylinder has an end closure with access therethrough to allow communication between the interior of the accumulator and a first side of the second piston of the pair. Normally, hydraulic oil is supplied to the cylinder to act on the first piston thereby causing both pistons to move axially against the high pressure gas of the accumulator which, in turn, axially moves the pistons when the hydraulic fluid is discharged. A tubular housing extends from the end closure through the accumulator to be terminated outwardly thereof. A hollow tube extending from the second piston into the tubular housing makes sliding, sealed contact therewith to allow communication from the tubular housing to a space between the pistons. Providing hydraulic fluid to the tubular housing introduces such fluid to the space between the pistons allowing the first piston to be axially moved as the second piston remains against the end closure.

3 Claims, 4 Drawing Figures

VALVE ACTUATOR

BACKGROUND OF THE INVENTION

1. Field of the Invention

This invention relates to a valve actuator and, more specifically, to such a valve actuator which normally operates with hydraulic oil being utilized to open a valve by acting on a piston in opposition to high pressure gas of an accumulator which provides a closing force when the hydraulic oil is discharged and alternatively allows hydraulic oil to be used for backup closure of the valve.

2. Description of the Prior Art

There have heretofore been utilized a number of means for closing large valves of the type found in feedwater and steam systems of nuclear power plants. It has been consistently felt advantageous for such valves to be capable of rapid closure. Because of safety and reliability requirements of these plants, the time required to close the valves within the system and the ability of the valve to safely withstand seismic shock are of real concern. One valve which has been found to fit these requirements includes a hydraulic cylinder mounted on the valve in alignment with the valve stem. A piston means slidably disposed within the cylinder includes a rod extending from a first side thereof through a first end of the cylinder to be joined to the valve stem. A high pressure gas accumulator is mounted about the second end of the cylinder to allow communication of the accumulator with the second side of the piston. The accumulator in the preferred embodiment of this device is generally spherical in shape, which shape has been found to minimize the overall weight of the actuator to reduce its cost and to lessen any seismic problems which might exist.

During normal operation, hydraulic oil is supplied to the cylinder to act on the first side of the piston causing it to move in opposition to the high pressure gas. Discharging the hydraulic oil then allows high pressure gas to act on the piston which, in turn, would close the valve.

While this device has been considered an effective, reliable means for valve operation, there has been expressed some concern as to a means for closing the valve should a rupture of the spherical accumulator or extensive leakage of the high pressure gas therefrom occur to interfere with the ability of the valve actuator to close the valve if required.

SUMMARY OF THE INVENTION

It is, therefore, an object of this invention to provide a valve actuator of the type using a hydraulic cylinder and a high pressure gas accumulator which includes an alternative means for closing the valve.

It is another object of the present invention to provide a valve actuator of the type described in which the alternative means for closing the valve is hydraulic oil.

It is still another object of this invention to provide a valve actuator of the type described which prevents hydraulic oil from being admitted to the high pressure gas accumulator during normal and alternative operation thereof.

These and other objects of the invention are provided in a preferred embodiment thereof which includes a valve actuator including a hydraulic cylinder having a central axis and a first and second end. A pair of pistons are separately, slidably mounted within the cylinder for movement along the axis between the first and second ends of the cylinder. An actuator rod is joined at a first side of a first of the pistons, extends through an opening in the first end of the cylinder for sealed, sliding movement therethrough and terminates at an extended end thereof which is capable of being joined to a valve stem outwardly of the cylinder. A high pressure gas accumulator is mounted on the cylinder and includes a pressure wall which is intersected by the cylinder to locate the second end thereof within the accumulator. The second end of the cylinder has an end closure structure with access port means therethrough to allow communication of an interior of the accumulator with a first side of a second piston of the pair. The cylinder has an access hole therethrough at the first end for supplying hydraulic fluid from a first source to the cylinder to act on the first side of the first piston to cause adjacent second sides of the first and second pistons to make abutting contact as the first and second pistons are moved toward the second end of the cylinder in opposition to the high pressure gas of the accumulator and for discharging the fluid to allow the high pressure gas to act on the first side of the second piston to cause movement of the pistons toward the first end of the cylinder. A tubular housing is at least partially disposed within the accumulator for alignment with the access to extend from the end closure structure through a portion of the pressure wall aligned with the axis and has an extended fitting external of the pressure wall. A hollow tube extends from the first side of the second piston along the axis into the tubular housing to make sliding, sealed contact therewith at an end of the tubular housing adjacent the end closure structure. The second piston has a central opening therethrough to allow communication between the interior of the hollow tube and a space between the second sides of the first and second piston. The extended fitting provides means for introducing hydraulic fluid from a second source through the hollow tube and between the first and second pistons to cause movement of the first piston toward the first end of the cylinder if high pressure gas is unavailable to act on the first side of the second piston.

DETAILED DESCRIPTION OF THE PREFERRED EMBODIMENT

Figure 1:
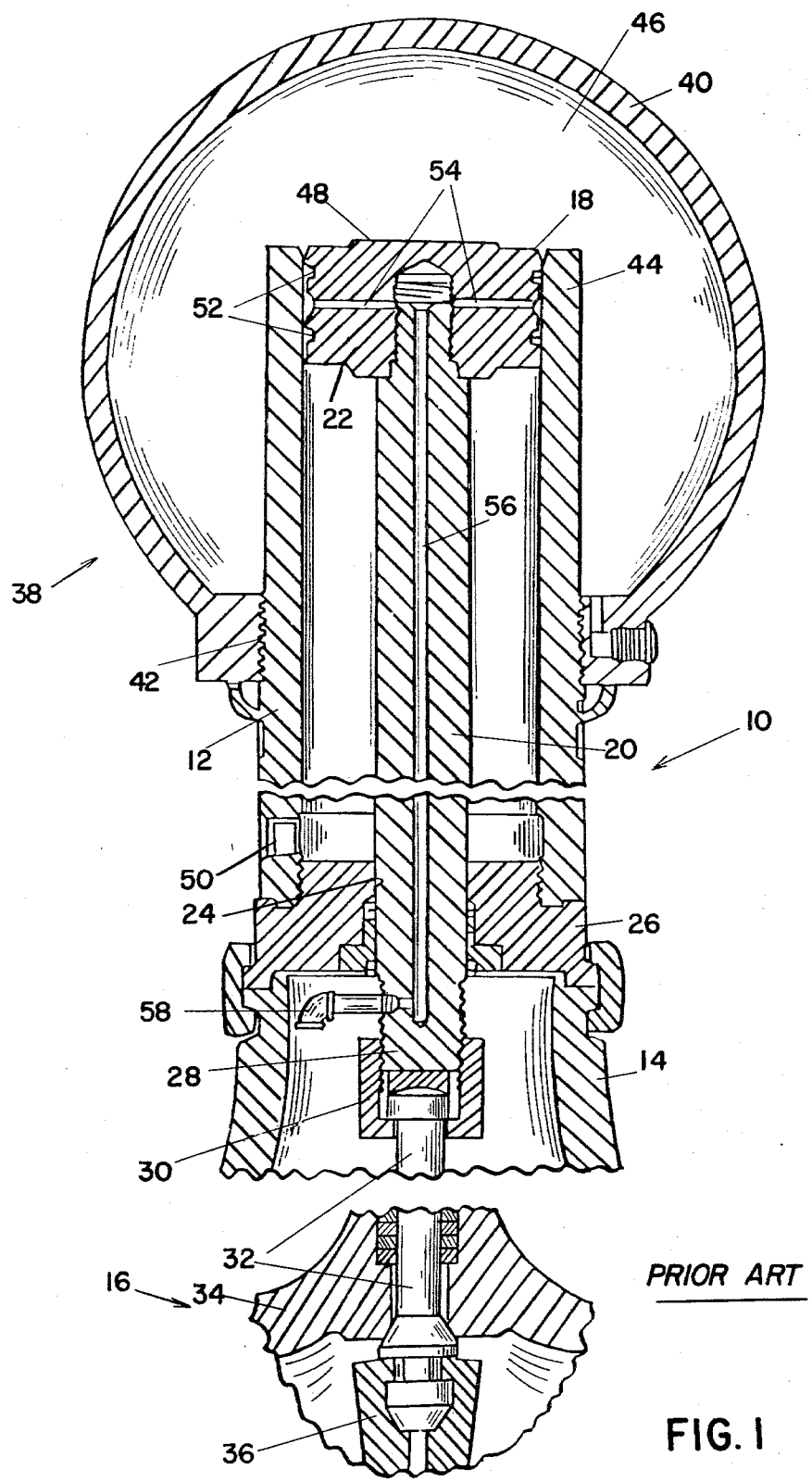
FIG. 1 is a sectional side view of a prior art valve actuator as mounted on a valve for actuation thereof.

As can be seen in FIG. 1, the prior art valve actuator 10 includes a hydraulic cylinder 12 which is mounted on a yoke 14 of a valve 16. The valve actuator 10 is similar to the valve actuator as disclosed in U.S. patent application Ser. No. 815,473, filed on July 14, 1977 by Donn W. Duffey, titled "Valve Actuator" and assigned to the assignee of the present invention. A piston 18 is slidably mounted within the cylinder 12 and includes an actuation rod 20 which extends from a first side 22 of the piston 18 through an opening 24 in a first end 26 of the cylinder 12. The rod 20 has an extended end 28 which is joined by a coupling device 30 to a valve stem 32.

The valve stem 32 extends through the bonnet 34 of the valve 16 to operate a closure member 36, in this case a gate device, of the valve 16. As shown, the piston 18 and thus the closure device 36 are in the open position.

The prior art valve actuator 10 further includes an accumulator 38 which, preferably, is spherical in shape and includes a pressure wall 40 which is intersected at an opening 42 therein by the cylinder 12. The cylinder 12 is fixedly, sealably joined to the pressure wall 40 and is positioned relative thereto to include a second end 44 which is disposed within the interior 46 of the accumulator 38. The second end 44 of the cylinder 12 is in this prior art embodiment opened to allow high pressure gas within the interior 46 of the accumulator 38 to act on a second side 48 of the piston 18.

During normal valve operation, hydraulic fluid is supplied to the interior of the cylinder 12 through an access hole 50 to act on the first side 22 of the piston 18 to cause it to move axially in opposition to high pressure gas of the accumulator 38 until the valve is in the open position as shown in FIG. 1. When closure of the valve is desired, the hydraulic fluid of the cylinder will be allowed to rapidly discharge through the access hole 50, allowing the high pressure gas to act on the second side 48 of the piston 18 to cause it to move axially in the closed direction.

As thus disclosed, the prior art valve actuator 10 normally provides a safe and reliable means for operating a valve but it can be seen that rupture of the pressure wall 40 of the accumulator 38 or rapid or extensive leakage of high pressure gas from the interior 46 of the accumulator 38 would significantly reduce the ability of the actuator 10 to close the valve 16.

Also as seen in FIG. 1 of the prior art valve actuator 10, there is provided a feature which is intended to insure that hydraulic oil will not be allowed to leak into the interior 46 of the accumulator 38. The piston 18 is provided a pair of sealing rings 52 generally for this purpose but should the sealing ring 52 adjacent the first side 22 allow hydraulic fluid to leak thereby, a means is provided for preventing the hydraulic fluid from leaking by the other sealing ring 52. Accordingly, radially extending passages 54 communicate the space between the sealing rings 52 with an axial passage 56 of the actuator rod 20. The passage 56 extends to the extended end 28 of the actuator rod 20 to terminate at a fitting 58 which can selectively be opened to the atmosphere. Therefore, should leakage occur as described above, the hydraulic fluid would pass through the passages 54 and the axial passage 56 to be discharged to atmosphere through the fitting 58. Since the interior 46 of the accumulator 38 is at a significantly higher pressure than these passages, the hydraulic fluid would not be able to leak by the sealing ring 52 adjacent the second side 48 of the piston 18.

Figure 2:
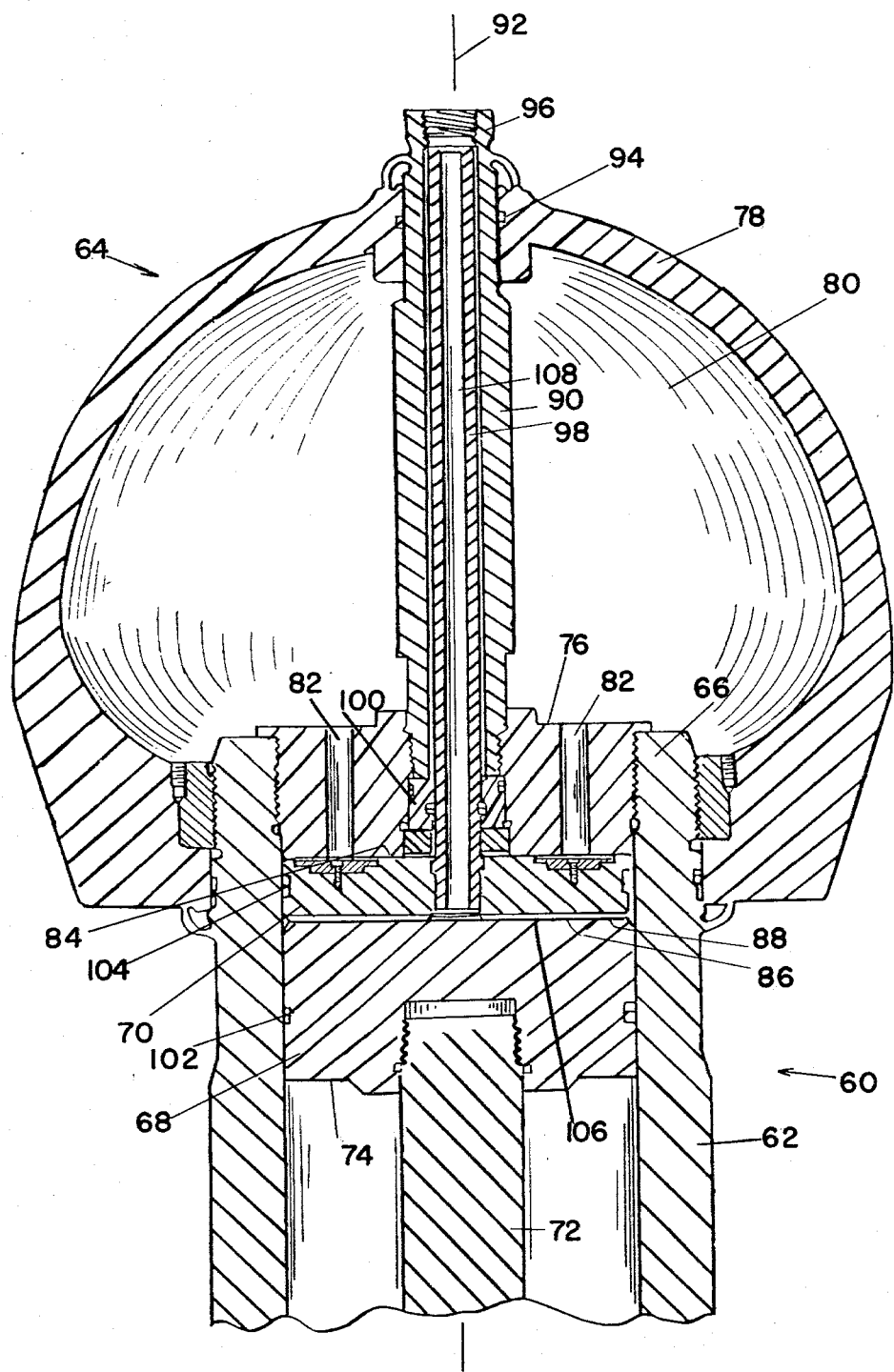
FIG. 2 is a sectional side view of the preferred embodiment of the invention as it would appear when the valve is in the open position.

As seen in FIG. 2, the preferred embodiment of the invention is in the form of a valve actuator 60 which includes a hydraulic cylinder 62 with a high pressure gas accumulator 64 again mounted on a second end 66 thereof. The piston 18 of the prior art device has been replaced in the actuator 60 with a pair of pistons 68 and 70 which are mounted for separate, sliding, axial movement within the cylinder 62. An actuator rod 72 is mounted to a first side 74 of the piston 68 to again extend outwardly of the cylinder 62 to be capable of being joined to a valve stem in a manner as previously described.

However, the cylinder 62 includes an end closure structure 76 at the second end 66 which positively limits the movement of the piston 70 toward the second end 66 of the cylinder 62. The accumulator 64 again includes a pressure wall 78 which is sealably intersected by the cylinder 62 to provide an interior 80 of the accumulator 64 including high pressure gas for normal valve operation. The preferred end closure structure 76 includes access ports 82 to allow communication of the interior 80 of the accumulator 64 with a first side 84 of the piston 70.

As shown in FIG. 2, the valve is in the open position and hydraulic fluid is acting on the first side 74 of the piston 68 as the respective second sides 86 and 88 of pistons 68 and 70 are in abutting contact. The high pressure gas of the accumulator 64 is communicating with the first side 84 of the piston 70 so that both pistons 68, 70 will be moved axially to close the valve upon discharge of the hydraulic fluid from the cylinder.

Although as thus described, the valve actuator 60 can be expected to operate in a manner similar to the prior art valve actuator 10 shown in FIG. 1. It can be seen in FIG. 2 that there are included other features of the invention not shown in this prior art device. Specifically, there is included in the valve actuator 60 a tubular housing 90 which is secured to the end closure structure 76 and extends at least partially through the interior 80 of the accumulator 64 along the axis 92 of the actuator 60. The tubular housing 90 sealably extends through a portion 94 of the pressure wall 78 which is aligned with the axis 92 to provide an extended fitting 96 of the tubular housing 90 which is external to the accumulator 64.

Additionally, the piston 70 is provided a hollow tube 98 which extends from the side 84 of piston 70 along the axis 92 into the tubular housing 90. A sealing means 100 is provided the tubular housing 90 at the end thereof adjacent the end closure structure 78 for sliding, sealed contact with the hollow tube 98 disposed therein.

Although as thus described, these new elements of the valve actuator 60 appear to effect normal operation of the actuator 60, they do provide an alternative means for providing a feature found in the prior art valve actuator 10 which was previously described. It is again desirable to insure that hydraulic fluid will not be allowed to leak by the pistons 68, 70 into the interior 80 of the accumulator 64. Although the pistons 68, 70 have each been provided a respective sealing ring 102 and 104, leakage of hydrualic fluid thereby would again be possible. Accordingly, a radially extending groove 106 has been provided in the surface of at least one of the second sides 86, 88 of the pistons 68, 70 to allow communication of the space between the sealing rings 102, 104 with the interior 108 of the hollow tube 98. Therefore, during normal operation of the valve actuator 60, any leakage of hydraulic oil by the sealing ring 102 would be allowed to pass along the groove 106 to the interior 108 of the hollow tube 98 for release to the atmosphere via the extended fitting 96 of the tubular housing 90. It will be seen that this is not the primary function of the new elements being provided to the valve actuator 60 but that these elements do provide an alternative means for providing a feature of the prior art actuator 10.

Figure 3:
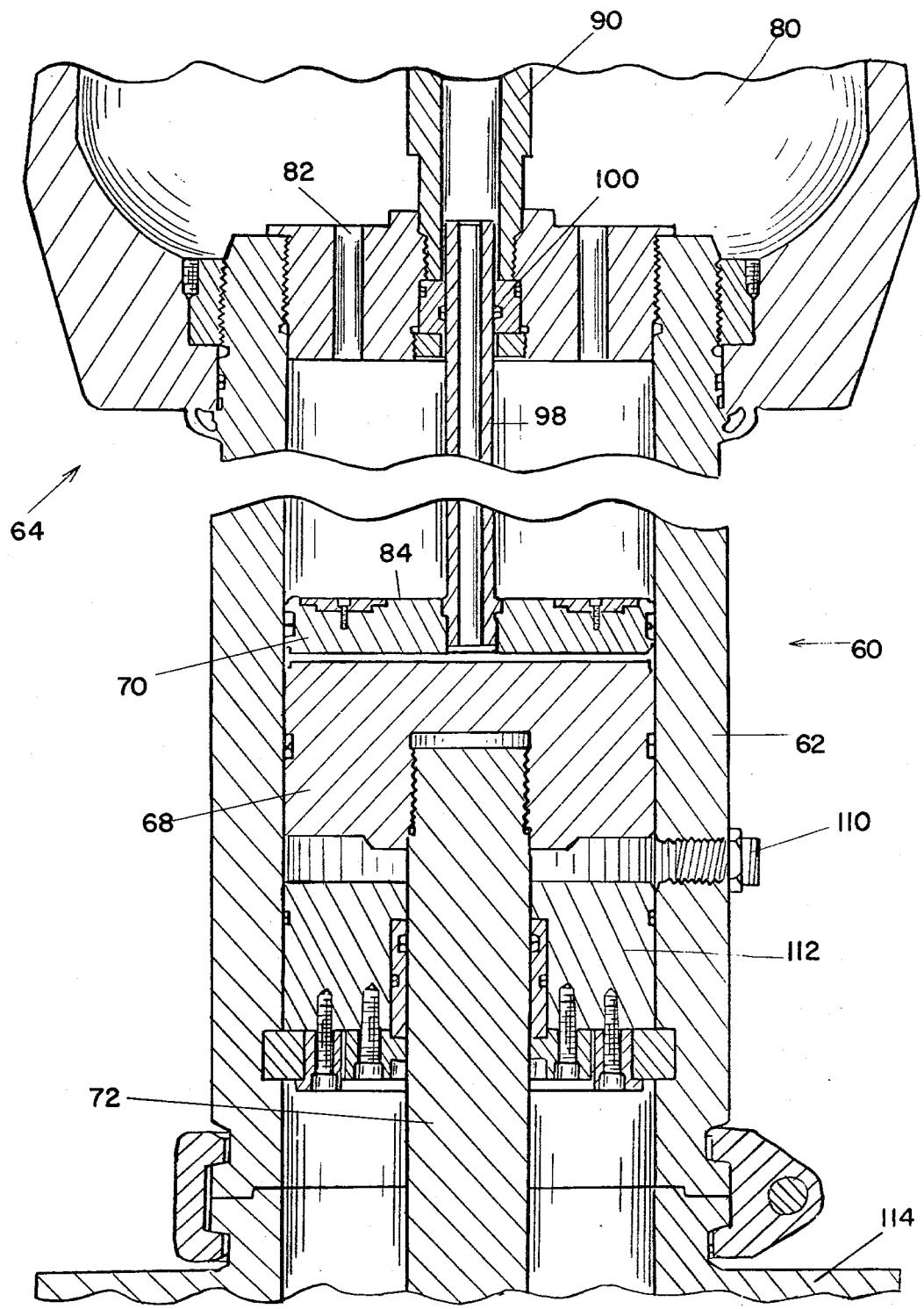
FIG. 3 is a sectional side view of the preferred embodiment of the invention as would appear during normal operation with the valve in the closed position.

Continuing with the normal operation of the valve actuator 60, it can be seen in FIG. 3 the alternative positions of the elements therein when the actuator 60 is utilized to close its associated valve. With hydraulic fluid having been discharged from the cylinder 62 through a common supply and discharge access opening 110 at the first end 112 thereof, both pistons 68, 70 are axially located adjacent the first end 112. As seen in FIG. 3, the actuator rod 72 extends in sliding, sealed contact through the first end 112 of the cylinder 62, which cylinder is mounted on a yoke 114 of a valve as has been described for the prior art actuator. Obviously, the high pressure gas of the accumulator 64 has been allowed to act on the first side 84 of the piston 70 to provide the required force needed to close the valve.

With the piston 70 so positioned, it can now be seen that the hollow tube 98 has been provided sufficient length to allow it to move relative to the tubular housing 90 but will remain in sliding, sealed contact with the sealing means 100 thereof. Therefore, the leakage path previously described remains available for transfer of hydraulic fluid between the pistons to a location external of the actuator 60 independent of the axial positions of the pistons 68, 70 during normal actuator operation.

As thus far explained, the valve actuator 60 incorporates elements not found in the prior art device but it can be seen that during normal use of the valve actuator it operates in a similar manner with similar results. However, it is the primary purpose of the present invention to provide a valve actuator which includes an alternative means for closure of the valve should high pressure gas normally retained within the accumulator be unavailable to provide adequate force for valve closure.

Figure 4:
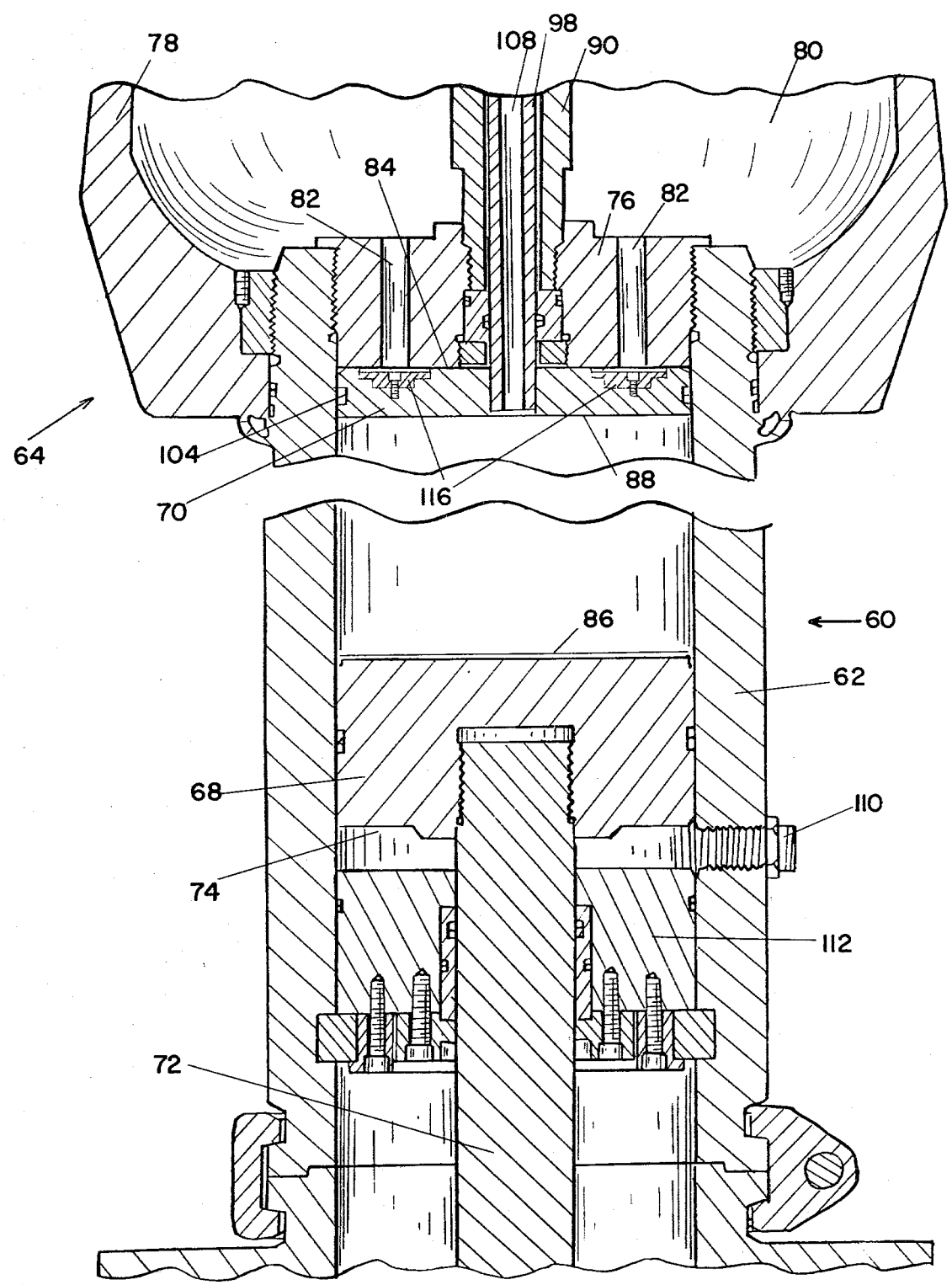
FIG. 4 is a sectional side view of the preferred embodiment of the invention as it would appear when the valve is in the closed position by utilization of the backup feature of the invention.

As seen in FIG. 4, the elements of the valve actuator 60 are shown in a position as would be required for closure of the valve if the normal means for closure of the valve cannot be utilized. If the valve were open and the high pressure gas was lost through leakage or a rupture of the accumulator 64, the initial position of the elements would still be as was shown in FIG. 2. To close the valve, hydraulic fluid from a second source (piping, valves etc., not shown) would be introduced to the extended fitting 96 of the tubular housing 90. Obviously, during this closure of the valve with this alternative means, there is a valve in the piping associated with the extended fitting 96 which is opened to atmosphere and which must be closed to allow the hydraulic fluid under pressure to be introduced to the tubular housing 90.

As seen in FIG. 4, hydraulic fluid under pressure within the tubular housing 90 will also pass through the interior 108 of the hollow tube 98 to act on the second sides 86, 88 respectively of pistons 68, 70. With hydraulic fluid being provided to the space between the second sides 86, 88, piston 68 will be moved axially toward the first end 112 of the cylinder 62 as hydraulic fluid at the first side 74 thereof is allowed to discharge through the access opening 110. The hydraulic force thus acting on the second side 86 of the piston 68 is sufficiently greater than the force of hydraulic fluid acting on the first side 74 to provide a means for closing the valve.

As hydraulic fluid is introduced between the pistons 68, 70, the fluid also acts on the second side 88 of the piston 70 to force it against the end closure structure 76, there now being little resistance because of the decreased pressure of the gas which might remain in the accumulator 64. While closing the valve with this alternative method, it can be seen that the leakage to insure that hydraulic fluid would not enter the interior 80 of the accumulator 64 is no longer available. Although, if the pressure wall 78 of the accumulator 64 were completely ruptured, it might not be of major concern, it would still be desirable to retain hydraulic fluid within the cylinder 62 rather than allow it to escape to the interior 80 of the accumulator 64. Therefore, an additional sealing means in the form of sealing elements 116 have been supplied to the second side 82 of piston 70 to effectively seal the second side 84 against the end closure 76 around the access ports 82. While there has not been provided a method of capturing leakage by sealing ring 104 should it fail, it is anticipated that the sealing means 116 would provide adequate backup to nevertheless prevent the escape of hydraulic fluid from the cylinder 62.

As shown hereinabove, the preferred valve actuator 60 includes features incorporating all of the advantages found in the prior art valve actuator device while further including an alternative means for closure of a valve should the high pressure gas of the accumulator be unavailable for normal valve closure. While the embodiment shown includes features which are preferred, it should be obvious to one skilled in the art that alternative means could be employed without departing from the scope of the invention as claimed. Specifically, it would be obvious to change the configuration of the end closure structure 76, the ports 82 and/or the sealing means 116 without altering the function of the accumulator to provide high pressure gas during normal operation. Similarly, the particular shape, dimensions or groove configuration employed in the preferred pistons 68, 70 might also be altered while still being considered within the scope of the invention.

I claim:

1. A valve actuator comprising:
   a hydraulic cylinder having a central axis and a first and a second end;
   a pair of pistons separately, slidably mounted within said cylinder for movement along said axis between said first end and said second end of said cylinder;
   an actuator rod joined at a first side of a first piston of said pair, extending through an opening in said first end of said cylinder for sealed, sliding movement therethrough and terminating at an extended end thereof which is capable of being joined to a valve stem outwardly of said cylinder;
   a high pressure gas accumulator mounted on said cylinder, said accumulator having a pressure wall which is intersected by said cylinder to locate said second end of said cylinder within said accumulator;
   said second end of said cylinder having an end closure structure with access port means therethrough to allow communication of an interior of said accumulator with a first side of a second piston of said pair;
   said cylinder having an access hole therethrough at said first end thereof for supplying hydraulic fluid from a first source to said cylinder to act on said first side of said first piston to cause adjacent second sides of said first and said second pistons to make abuting contact as said first and said second pistons are moved toward said second end of said cylinder in opposition to the high pressure gas of said accumulator and for discharging said fluid to allow said high pressure gas to act on said first side of said second piston to cause movement of said first and said second pistons toward said first end of said cylinder;

a tubular housing at least partially disposed within said accumulator and aligned with said axis to extend from said end closure structure through a portion of said pressure wall aligned with said axis, said tubular housing having an extended fitting external of said pressure wall;

a hollow tube extending from said first side of said second piston along said axis into said tubular housing to make sliding, sealed contact therewith at an end of said tubular housing adjacent said end closure structure, said second piston having a center opening therethrough to allow communication between the interior of said hollow tube and a space between said second sides of said first and said second pistons; and said extended fitting providing means for introducing hydraulic fluid from a second source through said hollow tube and between said first and said second pistons to cause movement of said first piston toward said first end of said cylinder if said high pressure gas is unavailable to act on said first side of said second piston.

2. The valve actuator as set forth in claim 1, wherein said first piston and said second piston respectively include piston sealing means, said extended fitting is vented to atmosphere when said hydraulic fluid is not being introduced thereto from said second source, and said space between said second sides of said first and said second pistons is capable of receiving hydraulic fluid leaking by said piston sealing means of said first piston to provide a leakage path through said hollow tube and said tubular housing to said extended fitting.

3. The valve actuator as set forth in claim 2, further including secondary sealing means between said end closure structure and said first side of said second piston around said access port means to prevent leakage of hydraulic fluid into said interior of said accumulator when said second piston is axially located against said end closure structure if said piston sealing means of said second piston were to allow leakage of hydraulic fluid thereby toward said first side of said second piston.

* * * * *